US008099091B2

(12) United States Patent
Shi et al.

(10) Patent No.: US 8,099,091 B2
(45) Date of Patent: Jan. 17, 2012

(54) METHOD TO CONTROL CONFIGURATION CHANGE TIMES IN A WIRELESS DEVICE

(75) Inventors: Jianxiong Shi, Pleasanton, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 12/779,907

(22) Filed: May 13, 2010

(65) Prior Publication Data

US 2011/0281570 A1 Nov. 17, 2011

(51) Int. Cl.
*H04M 3/00* (2006.01)
*H04J 3/06* (2006.01)

(52) U.S. Cl. .................. 455/418; 370/350; 370/465

(58) Field of Classification Search .......... 455/418–420, 455/466, 550.1, 502, 450, 515; 370/350, 370/465, 328, 345
See application file for complete search history.

(56) References Cited

U.S. PATENT DOCUMENTS

| | | | |
|---|---|---|---|
| 7,003,296 B2 | 2/2006 | de Montgolfier | |
| 7,643,837 B2 | 1/2010 | de Vries | |
| 2008/0214177 A1 | 9/2008 | Sehedic et al. | |
| 2008/0268840 A1 | 10/2008 | McDonald | |
| 2009/0111383 A1 | 4/2009 | Eckert et al. | |
| 2010/0135220 A1* | 6/2010 | Bergstrom et al. | 370/329 |

FOREIGN PATENT DOCUMENTS

WO  WO 2009/019129  2/2009

OTHER PUBLICATIONS

International Search Report dated Jul. 6, 2011, in PCT Application No. PCT/US2011/035214.
Written Opinion dated Jul. 6, 2011, in PCT Application No. PCT/US2011/035214.
European Telecommunications Standards Institute (ETSI) "Universal Mobile Telecommunications System (UMTS); Radio Resource Control (RRC)"; Protocol Specification, (3GPP TS 25.331 version 9.1.0 Release 9), Feb. 2010.
Zahid Ghadialy, "Introduction to Compressed Mode Measurements Procedure," http://www.3g4g.co.uk/Tutorial/ZG/zg_compressed_mode.html, Apr. 26, 2010.
"UMTS Compressed Mode," http://www.umtsworld.com/technology/compressed.htm, Apr. 26, 2010.
"UMTS RCC States," http://www.umtsworld.com/technology/RCC_states.htm, Apr. 27, 2010.
"GSM & UMTS technology system architecture—mobileguru.co.uk," http://www.mobileguru.co.uk./Mobile_Technology_globe.html, Apr. 27, 2010.

* cited by examiner

*Primary Examiner* — George Eng
*Assistant Examiner* — Marcos Torres
(74) *Attorney, Agent, or Firm* — Womble Carlyle Sandridge & Rice LLP

(57) ABSTRACT

A method to control configuration change times is performed at a mobile wireless communication device when the mobile wireless communication device is connected to a wireless network. The mobile wireless device is connected in a first configuration mode. The mobile wireless communication device receives a control message from a radio network subsystem in the wireless network at a local receive time. The received control message includes a time indication for when to start a configuration mode change of the mobile wireless communication device, which the device extracts from the control message. The mobile wireless communication device reconfigures to a second configuration mode, different from the first configuration mode, based on the extracted time indication and the local receive time.

21 Claims, 11 Drawing Sheets

METHOD TO CONTROL CONFIGURATION CHANGE TIMES IN A WIRELESS DEVICE

TECHNICAL FIELD

The described embodiments relate generally to wireless mobile communications. More particularly, a method is described for controlling configuration change times in a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located in the cell. The radio network subsystem can include a base transceiver station (BTS) in a Global System for Communications (GSM) network or a Node B in a Universal Mobile Telecommunications System (UMTS) network. Whether idle or actively connected, a mobile wireless communication device can be associated with a "serving" cell in a wireless communication network and be aware of neighbor cells to which the mobile wireless communication device can also associate. The quality of a communication link between the mobile wireless communication device and the radio network subsystem can vary based on the distance between them and on interference included in received signals at either end of the communication link. As the mobile wireless communication device moves further away from an associated radio network subsystem, eventually a neighbor cell can provide an equal or better performing communication link than the current serving cell. The mobile wireless communication device can include a process for determining if and when to switch cells with which it associates. If the mobile wireless communication device is actively connected to the serving cell, then the process of switching to a neighbor cell is known as "handoff."

To detect the presence of neighbor cells and to determine an expected quality of communication links to detected neighbor cells, the mobile wireless communication device can listen to messages periodically broadcast by radio network subsystems located in the neighbor cells. Radio network controllers in the wireless communication network can manage handoff of the mobile wireless communication device between different cells based on measurements taken by the mobile wireless communication device when listening to the periodically broadcast messages. In certain wireless communication networks, transmit and receive frequency spectra used by mobile wireless communication device in the serving cell can overlap transmit and receive frequency spectra used in neighbor cells. If the mobile wireless communication device transmits and receives continuously with the network subsystem located in the serving cell, then the mobile wireless communication device can be unable to listen to broadcast messages sent by neighbor cells that occupy the same frequency spectra. In order to suppress transmissions between the mobile wireless communication device and the network subsystem in the serving cell with which the mobile wireless communication device can be associated, network controllers in the wireless network can initiate an operating mode that includes quiet periods during transmissions that can be used for measurement. In a UMTS network using wideband code division multiple access (WCDMA) technology, such a transmission mode is referred to as a "compressed" mode.

A network controller can communicate parameters to the mobile wireless communication device in a network control message that can specify time periods for a "compressed" mode. The network control message can include a time indication for when the mobile wireless communication device and the serving cell's radio network subsystem can start and end. Time indications can be based at least partially on time synchronization counters maintained at the mobile wireless communication device and the radio network subsystem. Because both the serving cell's radio network subsystem and the mobile wireless communication device should enter the "compressed" mode simultaneously, the network control message start time indication can be at a future time, thereby allowing both the serving cell's radio network subsystem and the mobile wireless communication device time to prepare for changing transmission modes. The time required to transmit the entire network control message from the serving cell radio network subsystem to the mobile wireless communication device as a series of discrete packets, however, can be indeterminate. Each discrete packet in the network control message can be corrupted individually during transmission to the mobile wireless communication device and require re-transmission by the radio network subsystem. With sufficient time delays in transmission, the "future" time indication that specifies when to start the "compressed" mode can refer to a "past" time, i.e. the radio network subsystem can enter "compressed" mode before the mobile wireless communication device. Additionally, time synchronization counters maintained at the mobile wireless communication device and the radio network subsystem can be based on a digital counter having a finite length, and thus the time synchronization counters can "roll over" after a period of time. The mobile wireless communication device can interpret the time indications for starting the "compressed" mode as a future time when they actually can indicate a past time. The mobile wireless communication device and the serving cell radio network subsystem can start and end compressed modes at each end of a communication link between them at different times resulting in misaligned compressed mode time intervals and potentially incurring transmission errors. Similar errors can occur for a configuration change message from the serving cell radio network subsystem that includes at least a start time indication based on finite length time synchronization counters.

Thus there exists a need to control configuration time changes between a mobile wireless communication device and a radio network subsystem that accounts for transmission delays and time synchronization counter values.

SUMMARY OF THE DESCRIBED EMBODIMENTS

The described embodiments relate generally to wireless mobile communications. More particularly, a method is described for controlling configuration change times in a mobile wireless communication device.

In one embodiment, a method to control configuration change times is performed at a mobile wireless communication device when the mobile wireless communication device is connected to a wireless network. Initially, the mobile wireless device is connected in a first configuration mode. The mobile wireless communication device receives a control message from a radio network subsystem in the wireless network at a local receive time. The received control message includes a time indication for when to start a configuration mode change of the mobile wireless communication device, which the device extracts from the control message. The mobile wireless communication device reconfigures to a second configuration mode, different from the first configuration mode, based on the extracted time indication and the local receive time.

In a further embodiment, messages communicated between the mobile wireless communication device and the network subsystem are formed using multiple consecutive frames. Incorrectly received frames in a message can result in retransmissions, thereby extending the time to receive correctly a complete message. The mobile wireless communication device determines if the extracted time indication precedes the local receive time and reconfigures to the second configuration mode immediately.

In another embodiment, a mobile wireless communication device includes a wireless transceiver and a processor coupled to the wireless transceiver. The wireless transceiver receives messages from a wireless network subsystem, including a configuration mode change message that includes a time indication for the start of a configuration mode change from a first configuration mode to a second configuration mode. The processor is arranged to execute instructions for extracting the time indication from the received configuration mode change message. The processor compares the extracted time indication to a local receive time when the configuration mode change message is correctly received. The processor reconfigures the wireless transceiver to the second configuration mode at a time different from the time indicated in the configuration mode change message.

In a further embodiment, a computer program product encoded in a computer readable medium for reconfiguring a mobile wireless communication device connected to a wireless network is described. The computer program product includes non-transitory computer program code for receiving a control message from a radio network subsystem in the wireless network. The control message includes a time indication for when to start a configuration mode change. Non-transitory computer program code controls a transceiver in the mobile wireless communication device to transmit and receive messages as a series of consecutive frames. Values for a local frame counter in the mobile wireless communication device are calculated modulo an integer N, while values for an extended local frame counter are calculated modulo an integer M>N. First and second values for the extended local frame counter are determined for the first and last received frames of the control message. The mobile wireless communication device is reconfigured at a time earlier than indicated by the time indication in the control message when the difference between the second and first extended local frame counters is at least equal to the integer value N.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
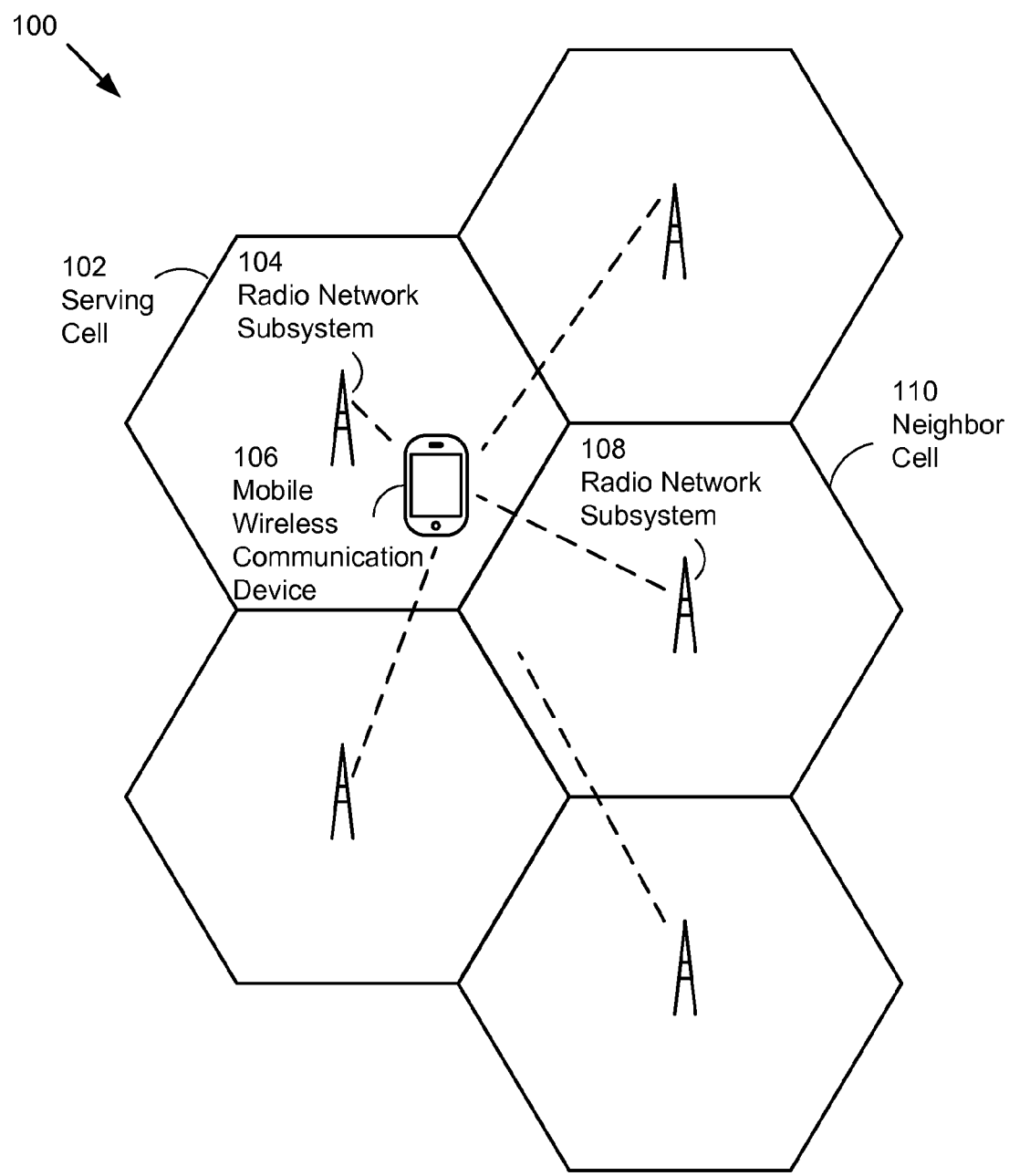
FIG. 1 illustrates a mobile wireless communication device located within a wireless cellular communication network.

FIG. 1 illustrates a wireless communication network 100 of overlapping wireless communication cells to which a mobile wireless communication device 106 can connect. Each wireless communication cell can cover a geographic area extending from a centralized radio network subsystem 104. The mobile wireless communication device 106 can receive communication signals from a number of different cells in the wireless communication network 100, each cell located at a different distance from the mobile wireless communication device. As the signal strength of a wireless communication signal decays proportionally to the square of the distance between a transmitting end and a receiving end, the mobile wireless communication device 106 can measure the received signal strength from several different cells in the wireless communication network 100. Measurements of received signal strength can be communicated from the mobile wireless communication device 106 to the wireless communication network 100, and radio network controllers (not shown) in the wireless communication network 100 can manage a "handover" of the mobile wireless communication device 106 between different cells as received signal strengths change.

During a "handover" between cells, radio communication links between the mobile wireless communication device 106 and the wireless communication network 100 can change. For a "hard" handover, minimal or no overlap time between old and new radio communication links can exist; "hard" handovers can occur when changing the radio communication link carrier frequency used for transmissions between the mobile wireless communication device 106 and the wireless communication network 100. The mobile wireless communication device 106 can initially receive transmissions from a serving cell 102. As the mobile wireless communication device 106 moves farther from the radio network subsystem 104 in the serving cell 102 (resulting in decreasing receive signal strength at the mobile wireless communication device 106 from the radio network subsystem 104) and closer to the radio network subsystem 108 in a neighbor cell 110 (resulting in increasing receive signal strength from the radio network subsystem 108), a "hard" handover between the serving cell 102 and the neighbor cell 110 can occur when receive signal strengths measured at the mobile wireless communication device 106 cross certain thresholds. In a representative embodiment, the "hard" handover can occur when the receive signal strength of the neighbor cell 110 exceeds the signal strength of the serving cell 102. "Soft" handovers can also be used to ease the transition between cells. During a "soft" handover, a new radio link can be added before the old radio link is removed, also based on measured signal strengths, although the thresholds can differ from those used for "hard" handovers. Handovers can also occur between two different wireless communication networks, including when each network uses a different wireless communication technology. For example, a handover can occur between two different 3G networks, or between a 2G and a 3G network, which can be referred to as an inter-RAT (radio access technology) handover. Handovers can require coordination between the mobile wireless communication device 106 and the radio network subsystems 104 of the wireless communication network 100 to ensure a smooth and seamless transition.

Figure 2:
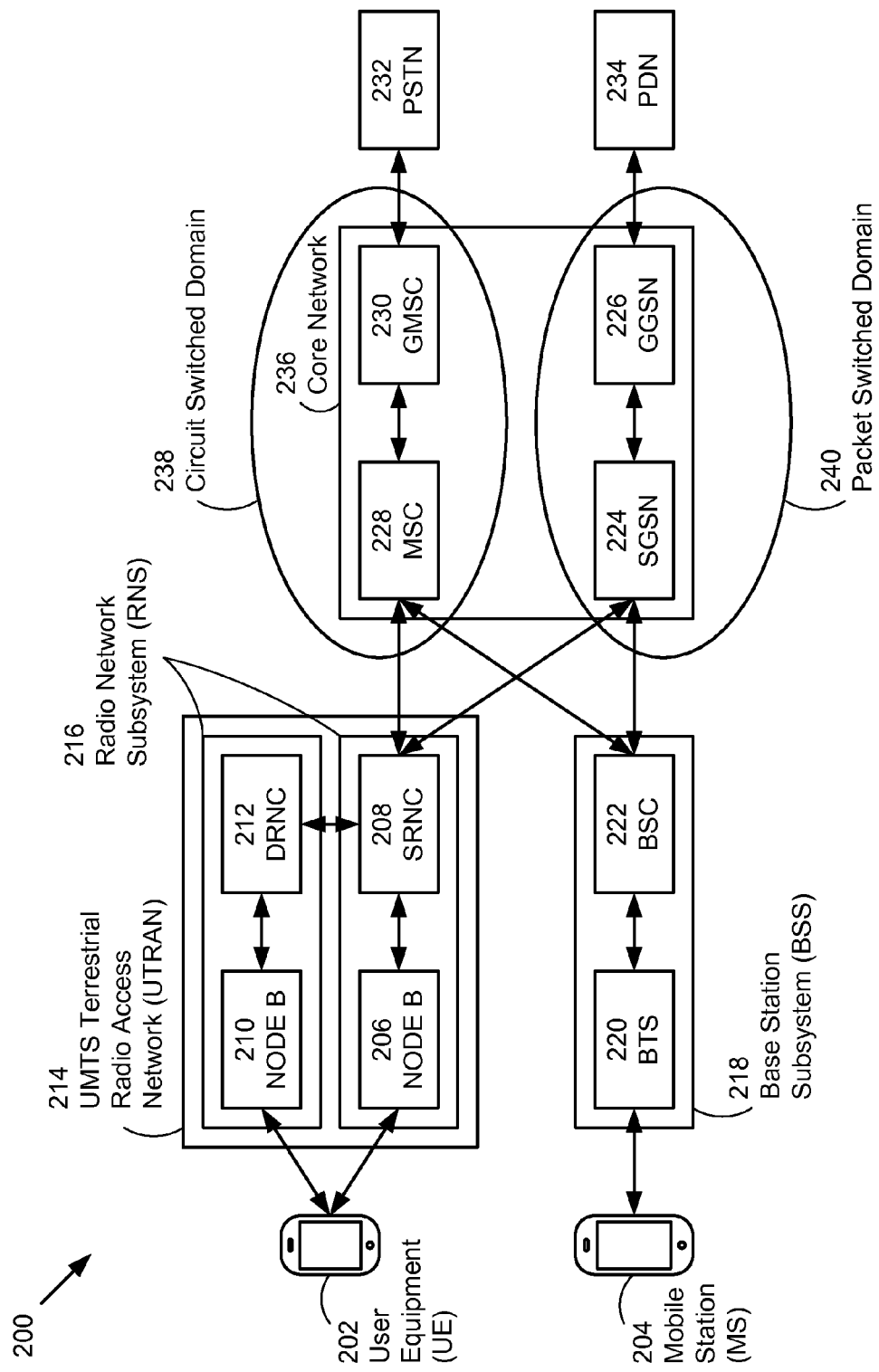
FIG. 2 illustrates a hierarchical architecture for a wireless communication network.

FIG. 2 illustrates a hybrid hierarchical architecture 200 for a wireless communication network that includes both UMTS and GSM access network elements. A mobile wireless communication device 106 operating in a GSM wireless communication network can be referred to as a mobile station (MS) 204, while a mobile wireless communication device 106 operating in a UMTS network can be referred to as user equipment (UE) 202. (Wireless mobile communication devices 106 can include the capability of connecting to multiple wireless communication networks that use different wireless radio network technologies, such as to a GSM network and to a UMTS network; thus the description that follows can also apply to such "multi-network" devices as well.) The MS 204 can connect to the GSM wireless communication network through a radio network subsystem known as a base station subsystem (BSS) 218. The BSS 218 can include a base transceiver station (BTS) 220 that transmits and receive radio frequency signals between the MS and the wireless communication network and a base station controller (BSC) that manages the communication between a core network 236 and the MS 204. In a GSM wireless communication network, an MS 204 can be connected to one BSS at a time. As the MS 204 moves throughout the GSM wireless communication network, the BSC 222 can manage handover of the MS 204 to different BTS 220 located in different cells. The GSM radio access network BSS 218 connects to a centralized core network 236 that provides circuit switching and packet switching capabilities.

The core network 236 can include a circuit switched domain 238 that can carry voice traffic to and from an external public switched telephone network (PSTN) and a packet switched domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched domain 238 and the packet switched domain 240 of the core network 236 can each operate in parallel, and both domains can connect to different radio access networks simultaneously. The UTRAN 214 in the UMTS wireless access network can include multiple radio network subsystems (RNS) 216. Each RNS 216 can include a "Node B" 206/210 that transmits and receives radio frequency signals and a radio network controller (RNC) 208/212 that manages communication between the "Node B" 206/210 network elements and the core network 236. Unlike the MS 204 in the GSM radio access network, the UE 202 can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that provides additional radio link resources through a secondary Node B 210 that supplements the radio link through the primary Node B 206. When connected to more than one RNS 216, the UE 202 can be considered to be in a "soft" handover state. The serving RNC 208 can provide a single connection point for communication between the UE 202 and the core network 236, including traffic that passes through the secondary Node B 210 and the drift RNC 212.

A "soft" handover can be used to transfer a connection of the UE 202 seamlessly between different Node B's located in different RNS's 216. Handover can also be used to manage adding and deleting radio links between the UE 202 and the UTRAN 214 to change a connection. In order to determine properties of radio frequency signals received at the UE 202, the RNS 216 can use measurements taken by the UE 202 and communicated back to the RNS 216 through measurement control messages. For example, consider the wireless communication network 100 in FIG. 1 to be a UMTS wireless network. The radio network subsystem 104 in the serving cell can direct the mobile wireless communication device 106 to measure the radio network subsystem 108 in neighbor cell 110 as well as other radio network systems located in nearby neighbor cells.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same frequency spectrum. Received signals can be demodulated by correlating them with a correctly matched de-spreading code. As the set of spreading codes used in W-CDMA can be mutually orthogonal, signals intended for a particular UE can be separated from signals transmitted to other UE, even though all of the signals can overlap and use the same frequency spectrum simultaneously. UMTS spread spectrum signals can occupy a wider 5 MHz channel bandwidth compared with a narrower 200 kHz channel bandwidth used by GSM signals.

Figure 3:
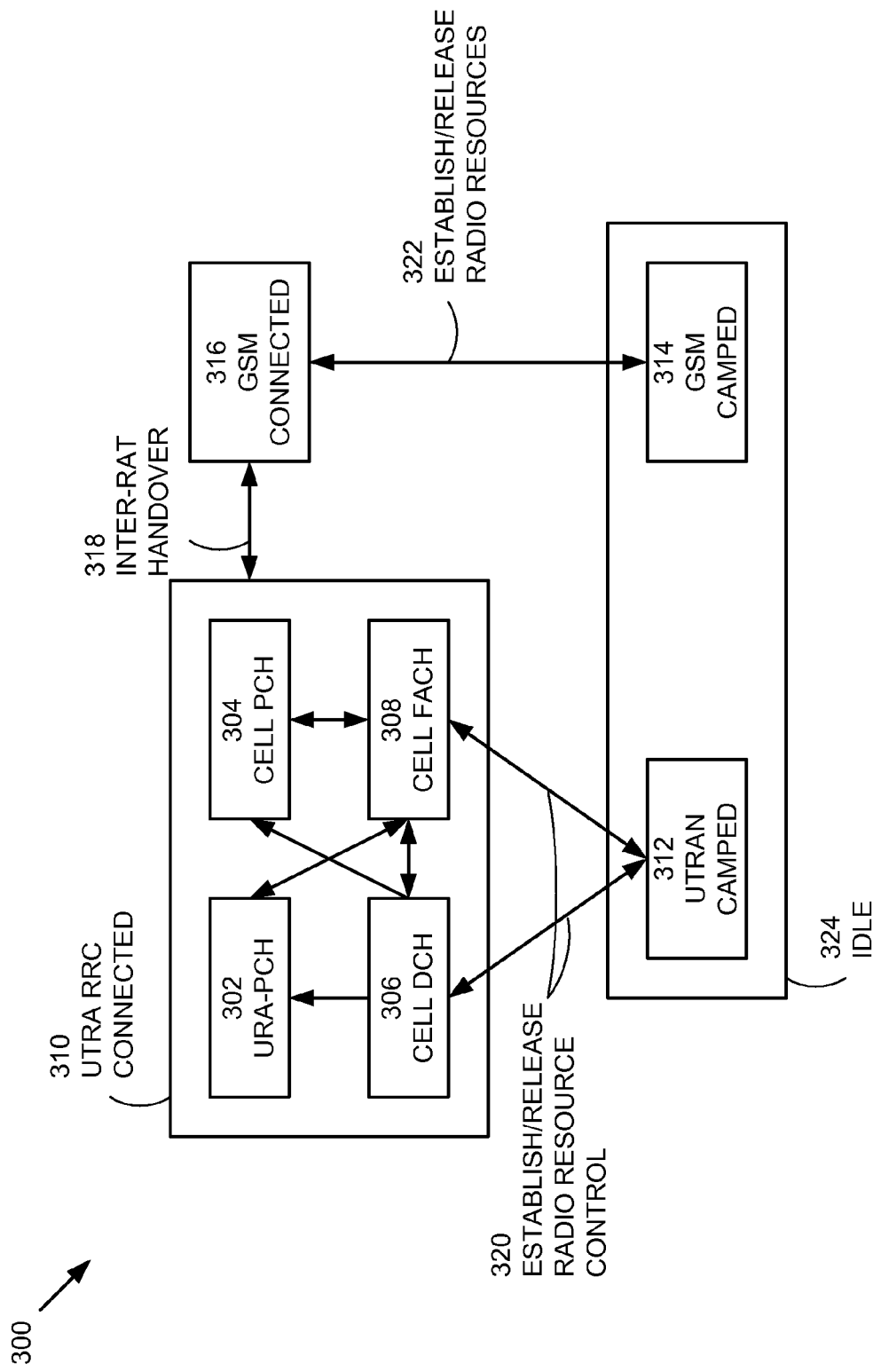
FIG. 3 illustrates a state transition diagram for a mobile wireless communication device.

FIG. 3 illustrates a state diagram 300 that includes several different states in which a mobile wireless communication device 106 can exist. After a "power on" initialization, the mobile wireless communication device 106 can search for nearby access network sub-systems, such as a base station subsystem BSS 218 for a GSM network or an RNS 216 in a UTRAN 214 for a UMTS network. The mobile wireless communication device 106 can measure received radio signals at different frequencies when not connected to a particular network. The measurements can be used to determine signal strengths and quality for different available nearby cells. The mobile wireless communication device 106 can "camp" on a cell in the GSM or UMTS network in an idle mode 324. On the GSM network, the mobile wireless communication device 106 (equivalently the mobile station MS 204) can transition between a GSM "camped" state 314 and a GSM "connected" state 316 by establishing and releasing radio resources 322 through communication with the BSS 218. Similarly on the UMTS network, the mobile wireless communication device 106 (equivalently the user equipment UE 202) can change between a UTRAN "camped" state 312 and a UTRA radio resource control "connected" state 310 by establishing and releasing radio resource control 320 through communication with the RNS 216 in the UTRAN 214. The UMTS UE 202 can be in one of four distinct states when connected to the UMTS network. In a cell DCH (dedicated channel) state 306, the UE 202 can be allocated a dedicated physical channel in both the uplink and downlink directions including transport channels to transmit and receive in both directions. In a cell FACH (forward access channel) state 308, the UE 202 can have no dedicated physical channel allocated but can monitor a common downlink FACH and transmit on a common shared transport uplink channel. In a cell PCH (paging channel) state 304, the UE 202 can have no dedicated physical channel allocated but can monitor a common pace indicator channel (PICH) with no uplink activity possible. A URA (UTRAN registration area) PCH state 302 resembles the cell PCH state 304, except that the UE 202 can be known to the UMTS network based on a broader "URA" level rather than on a narrower "cell" level. A URA can consist of multiple cells in a UMTS network.

Figure 4:
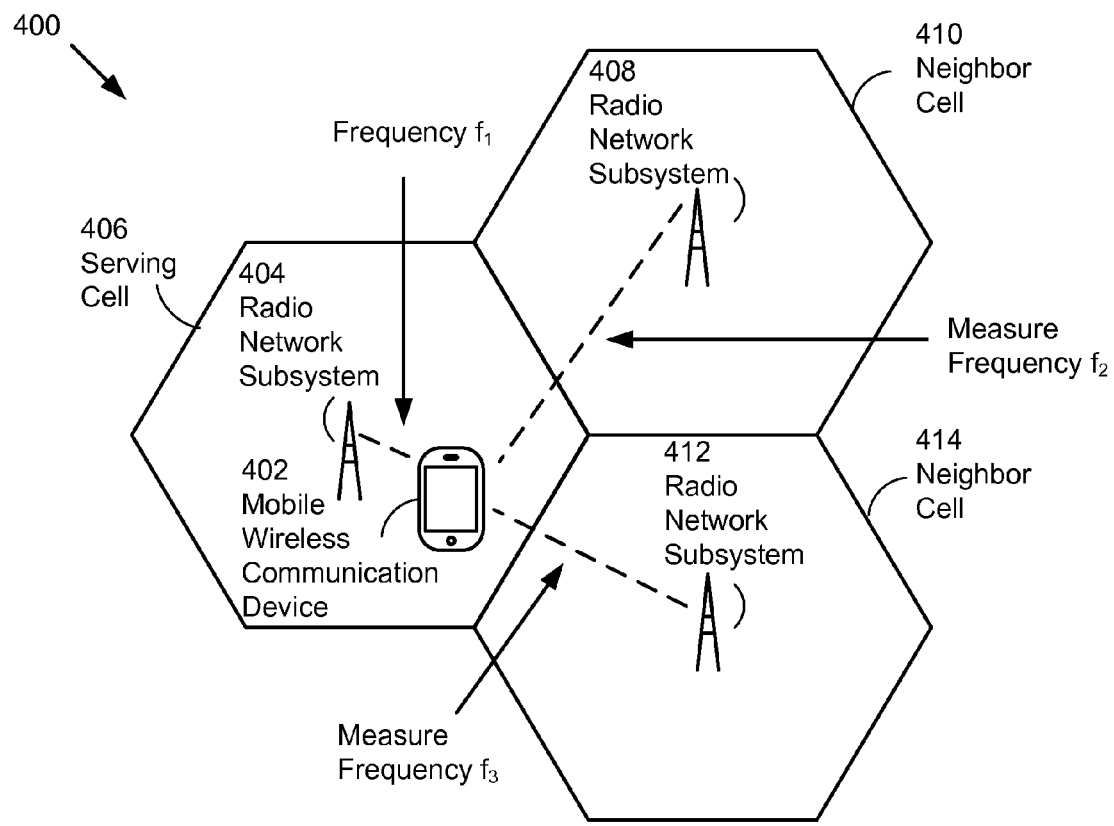
FIG. 4 illustrates a mobile wireless communication device measuring signals in a wireless cellular communication network.

As geographic areas for different wireless networks can overlap and cover different regions, a multi-network capable mobile wireless communication device 106 can maintain a continuous connection when switching between a UMTS network and a GSM network by using an inter-RAT handover 318. When connected to the UMTS network, communication between the UE 202 and the UMTS network using W-CDMA can be continuous, thus not permitting silent periods in which to listen for and measure signals from other cells in the same network (or cells in a different network). The continuous W-CDMA transmissions differ from time division multiple access (TDMA) transmissions where only certain time slots can be used by the mobile wireless communication device 106 when connected, while other time slots remain open for use by other wireless communication devices. The "idle" time slots can permit the wireless communication device 106 opportunities to listen for signals broadcast by radio network subsystems other than the one to which it is connected. As illustrated in FIG. 4, a mobile wireless communication device 402 can be connected to a radio network subsystem 404 in a serving cell 406 using a carrier frequency $f_1$. A neighbor cell 410 can contain a radio network subsystem 408 that transmits on a different carrier frequency $f_2$, while a neighbor cell 414 can contain a radio network subsystem 412 that transmits on a carrier frequency $f_3$. In order to detect and measure transmissions from radio network subsystems 408 and 412, the receiver in the mobile wireless communication device 402 can be tuned to each radio network subsystem's frequency $f_2$ and $f_3$ intermittently. When the mobile wireless communication device 402 is in an "idle" state, frequency tuning of the device's receiver can be used because no active connection exists; however, when the mobile wireless communication device is in a "connected" state, gaps in transmissions (i.e. a compressed mode) can be created so that the mobile wireless communication device 402 can listen.

Figure 5:
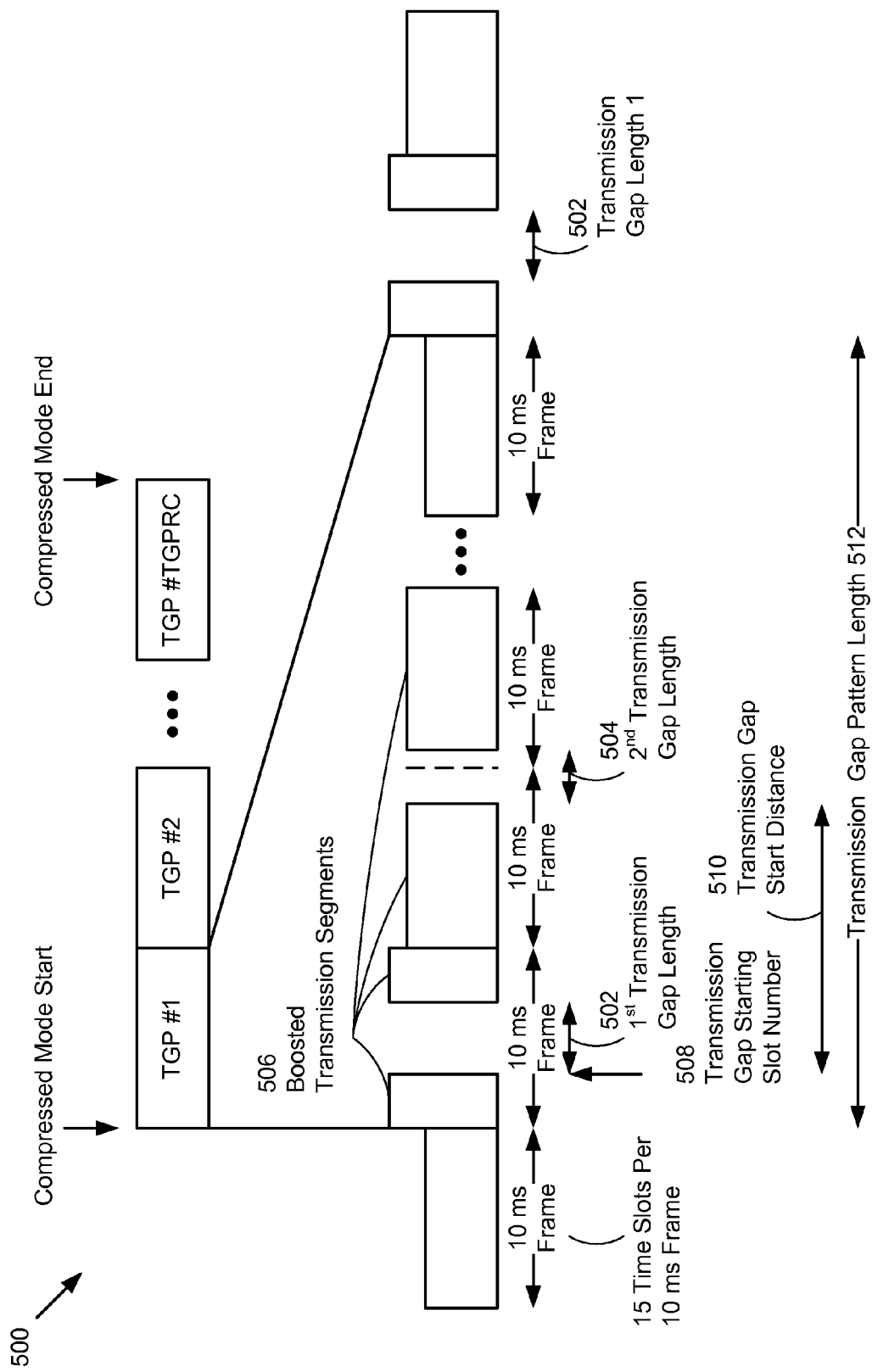
FIG. 5 illustrates a compressed mode transmission pattern for a mobile wireless communication device.

FIG. 5 illustrates a representative frame structure 500 for compressed mode transmissions. The compressed mode can be uniquely defined by a set of parameters communicated to the UE 202 by the UMTS network. Communication between the UE 202 and the UMTS network can be divided in a sequence of successive frames, each frame occupying a uniform time interval of 10 ms. Each 10 ms frame can be subdivided into multiple time slots, and in an uncompressed mode transmissions can continuously occupy all time slots. In a compressed mode, certain frames can include time slots with no transmission. In a representative embodiment, the compressed mode can be specified by a repeated transmission gap pattern (TGP) of frames, each TGP having a transmission gap pattern length (TGPL) 512 of consecutive frames. The TGP can repeat a transmission gap pattern repetition count (TG-PRC) number of times during the compressed mode. Within a transmission gap pattern, two different transmission gaps can be specified. A first transmission gap can start in the first 10 ms frame of the transmission gap pattern at a transmission gap starting slot number 508 and can span a first transmission gap length 502. Time slots within the first transmission gap can carry no transmitted signals, while surrounding time slots in the same 10 ms frame that contains the first transmission gap can be boosted in signal power to compensate. By boosting transmission segments adjacent to the transmission gap, a constant data transfer rate can be maintained. The transmission gap pattern can include a second transmission gap having a second transmission gap length 504 starting at a transmission gap start distance 510 after the start of the first transmission gap. As illustrated in FIG. 5, transmission gaps can be contained within a single 10 ms frame (as shown for the first transmission gap) or straddle two adjacent 10 ms frames (as shown for the second transmission gap). A minimum number of time slots in each 10 ms frame can be required to ensure that boosted transmission segments 506 can stay beneath a peak power level and that a constant data transfer can be achieved across frames with and without transmission gaps. Compressed mode can be apply to both uplink and downlink directions. An uplink compressed mode can occur, for example, if the frequency to measure is close to a frequency currently in use in the uplink direction to prevent inter-frequency interference during a measurement of received signals in the downlink direction. The specific parameter values used to specify a compressed mode can vary based on the location of the UE 202 within a UMTS network and also based on properties of the UMTS network. For example, the number of frequencies to measure can depend on the network topology, such as the number and density of cells in a region, with more frequencies available to measure requiring a longer time to be allocated for measurement.

Figure 6:
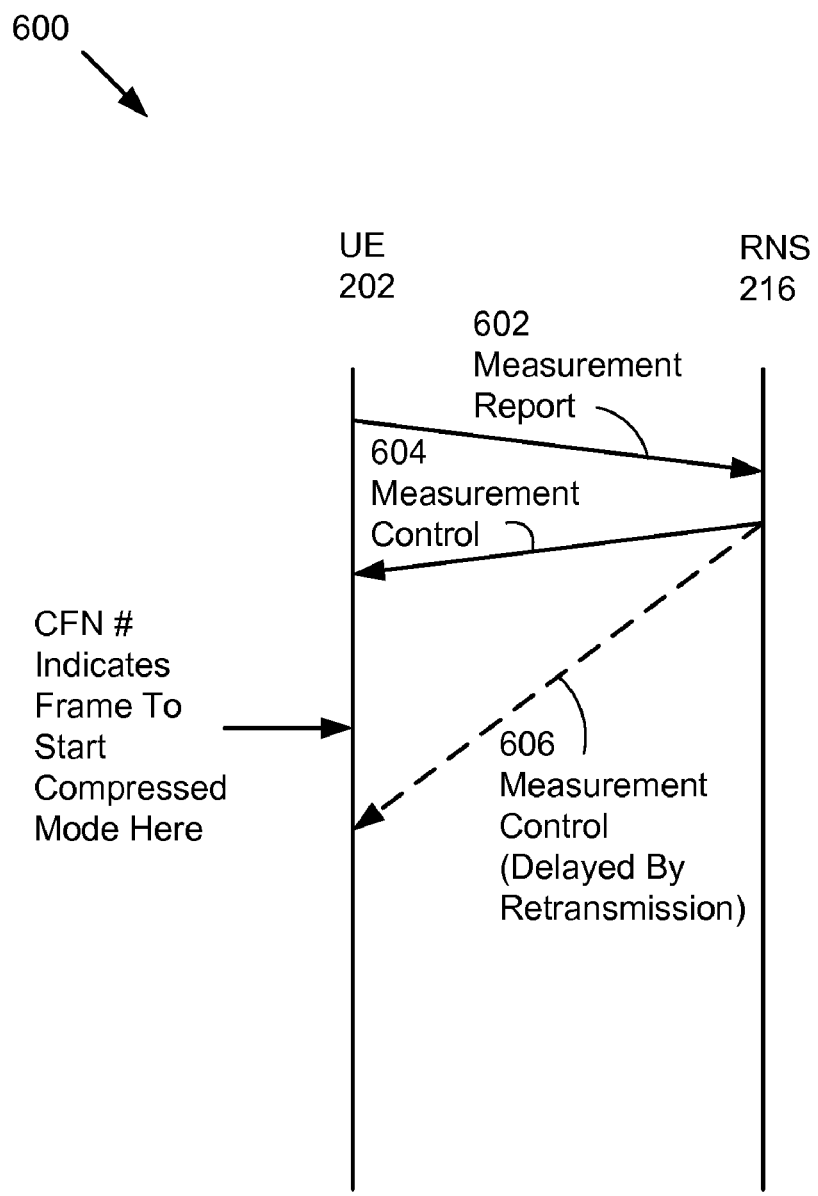
FIG. 6 illustrates a measurement message sequence between a user equipment (UE) and a radio network subsystem (RNS).

A radio network subsystem (RNS) 216 in the UMTS network, to which the UE 202 is actively connected, can determine when to enter a compressed mode to undertake measurements. As shown by a message exchange sequence 600 in FIG. 6 between a UE 202 and an RNS 216, a measurement report 602 can be sent to the RNS 216. Measurements reports can be sent by the UE 202 in response a request from the RNS 216 or independently as a regular or sporadic update from the UE 202. The measurement report 602 can describe properties of signals received by the UE 202 while connected to the RNS 216. Based on the values received in the measurement report 602, the RNS 216 can command a measurement period that uses a compressed mode by sending a measurement control message 604 to the UE 202. Measurements at the UE 202 using the compressed mode can be for a different UMTS frequency than currently used, or for a GSM frequency, or for a radio link frequency using another transmission protocol. The measurement control message 604 can include a time indication when the compressed mode should start and end, as well as a transmission gap pattern as shown in FIG. 5. (The measurement control message 604 can also not include a time indication when the compressed mode should end, in which case, a second measurement control message can be sent to exit the compressed mode.) Both the UE 202 and the RNS 216 are expected to start and end the compressed mode at the same time. Time synchronization between the UE 202 and the RNS 216 can be maintained by using frame counters at each end of the radio link between them. A radio network controller associated with the RNS 216 in the serving cell can maintain a system frame number (SFN) counter that increments once per 10 ms frame. In a representative embodiment, the SFN counter can have a length of 12 bits, and thus values for the SFN counter can "roll over" every 40.96 seconds. The RNS 216 can transmit SFN counter values at regular intervals over a broadcast channel, such as a broadcast control channel (BCCH) in a UMTS network. The UE 202 can maintain time synchronization at a physical channel layer 1 level using the broadcast SFN counter values.

The UE 202 and the RNS 216 can also maintain time synchronization at higher level layers (medium access control (MAC) layer 2, radio link control (RLC) layer 2, and radio resource control (RRC) layer 3) using a connection frame number (CFN) counter derived locally at each end of a connection between the UE 202 and the RNS 216 based on the layer 1 SFN counter. In a representative embodiment, the CFN counter can have a length of 8 bits, and thus values for the CFN counter can "roll over" every 2.56 seconds (substantially shorter than the SFN counter "roll over"). When the UE 202 is connected to the RNS 216 in the Cell DCH 306 state, the CFN counter value can be related to the SFN counter value as CFN=(SFN−(DOFF div 38400)) mod 256, where DOFF can be an offset value supplied by the radio network controller in the RNS 216 when establishing a connection with the UE 202. When the UE 202 is in a Cell FACH 308 state, the CFN counter value can be computed from the SFN counter value as CFN=SFN mod 256 (i.e. the 8 least significant bits of the 12 bit SFN value). An "extended" CFN value can also be calculated in either the Cell PCH 306 state or the Cell FACH 308 state by using all 12 bits rather than only the least significant 8 bits, i.e. the same equations as above excluding the modulo 256 operation.

In the measurement control message 604 sent by the RNS 216 to the UE 202, a CFN value can be included as a time indication of a frame when the UE 202 and the RNS 216 should start compressed mode. As indicated in FIG. 5, compressed mode can start at a particular time slot (based on the transmission gap starting slot number 508) in the frame indicated by the CFN value included in the measurement control message 604. If the UE 202 can receive and interpret the measurement control message 604 in a timely manner, then the UE 202 and the RNS 216 can enter compressed mode at the same time. Over a "good" radio link, the measurement control message 604 can be received in less than 100 ms, and with prompt processing at the UE 202 the compressed mode can be entered in much less than the 2.56 second "roll over" period of the CFN counter. The measurement control message 604 sent by the RNS 216 can be a layer 3 signaling data unit (SDU) transmitted over the radio link to the UE 202 as a sequence of layer 2 protocol data units (PDU). A layer 2 protocol handler at the UE 202 can ensure that all of the PDUs of the SDU are received correctly, before reassembling the layer 3 SDU. In a representative embodiment of the layer 2 protocol, receipt by the UE 202 of each layer 2 PDU can be acknowledged to the sending RNS 216. Without acknowledgement from the UE 202, the PDU can be retransmitted until successfully received by the UE and acknowledged to the RNS 216. In another representative embodiment of the layer 2 protocol, each PDU can contain a sequence number, and the UE 202 can request retransmission of specific missing PDUs based on the sequence numbers of PDUs received at the UE 202.

If the measurement control message 604 is delayed by retransmissions, then the frame indicated by the CFN value in the delayed measurement control message 606 can be in the past rather than in the future as intended. With a delayed measurement control message 606, the UE 202 and the RNS 216 can enter and exit compressed mode at different times potentially resulting in transmission errors over the radio link connection. For example, if the delayed measurement control message 606 specifies a CFN value of 100 for the start of a compressed mode period, the RNS 216 can enter the compressed mode at a CFN value of 100, while the UE 202 can enter the compressed mode at a subsequent CFN value of 100 after a roll over of one or more multiples of 256 frames (roll over time interval).

Figure 7:
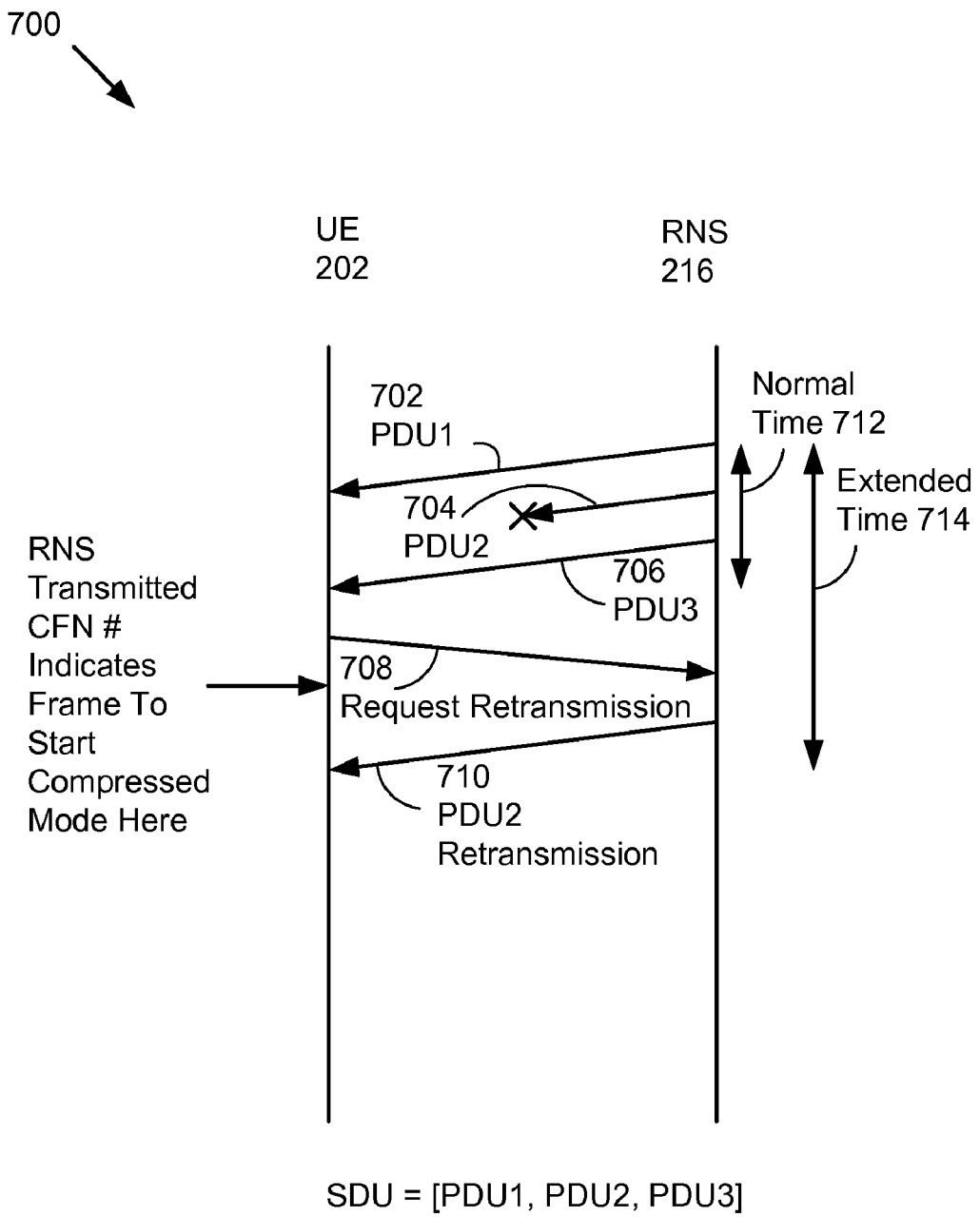
FIG. 7 illustrates a packet transmission sequence with retransmission between a UE and an RNS.

FIG. 7 illustrates a representative sequence 700 of message transfer between the UE 202 and the RNS 216, in which an SDU includes three PDUs, each PDU having a unique sequence number. The first and third PDUs (PDU1 702, PDU3 706) can be received successfully at the UE 202 as shown, while the second PDU (PDU2 704) can be corrupted during transmission and not be received successfully at the UE 202. The UE 202 can request retransmission 708 of the missing PDU2 704, and the RNS 216 can subsequently retransmit PDU2 710. Without retransmission, the SDU can be successfully received by the UE 202 in a "normal" time interval 712, but with retransmission, the SDU can be successfully received by the UE 202 over an "extended" time interval 714. The end of the extended time interval 714 can occur after the frame indicated by the CFN value embedded in the SDU in which compressed mode should start. Multiple retransmissions can extend the time for successfully receiving an SDU considerably resulting in a misalignment of compressed modes at each end of a radio communication link.

Figure 8:
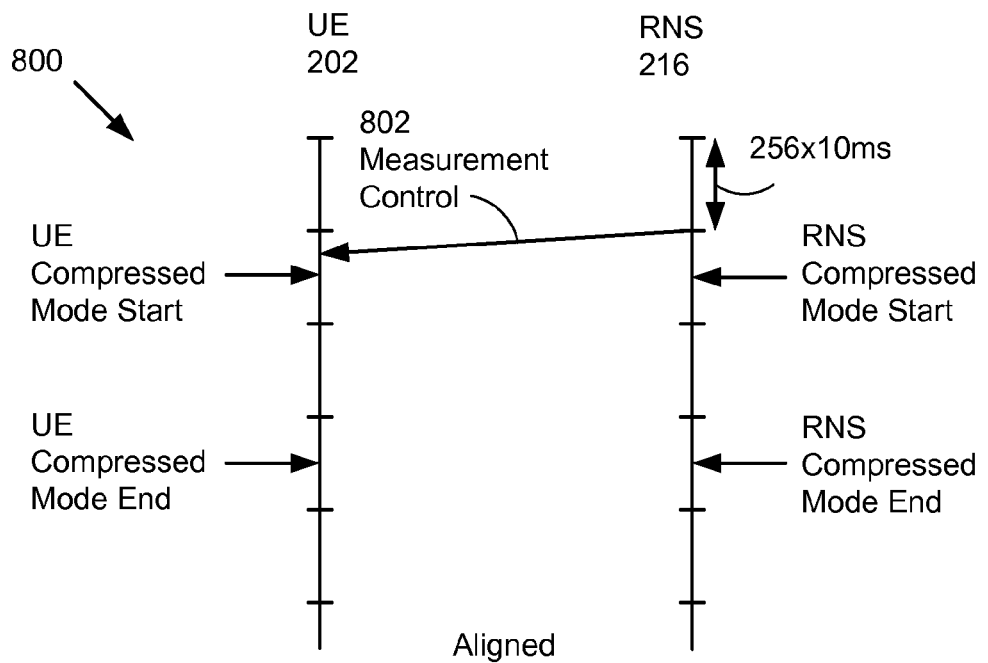
FIG. 8 illustrates aligned and misaligned compressed mode intervals for a UE and an RNS.
Figure 8:
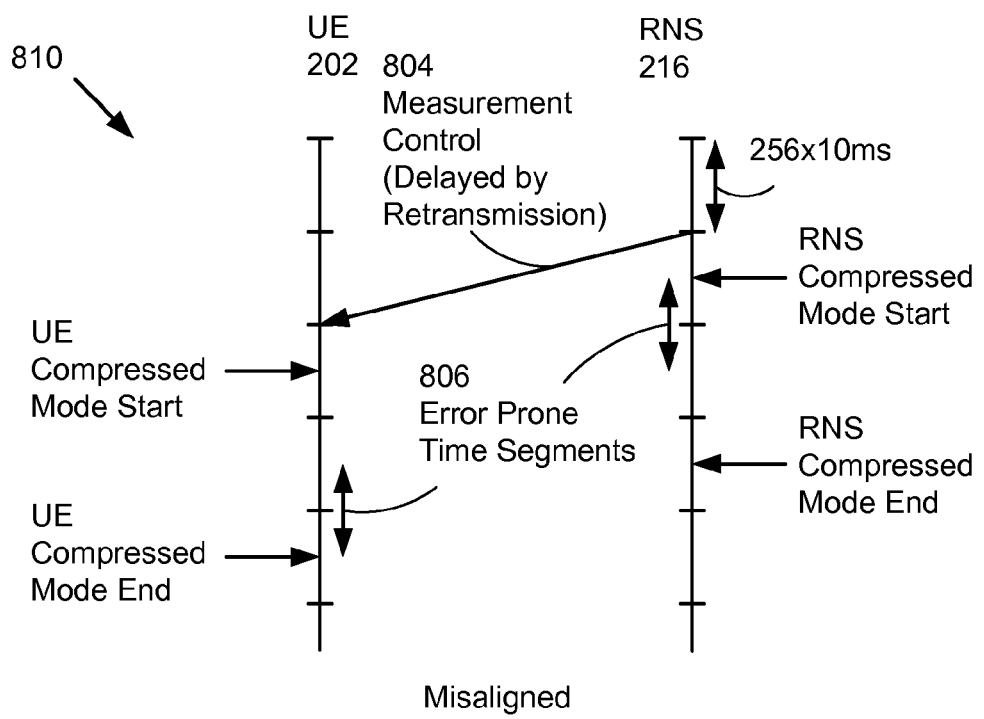

With delayed receipt of the complete SDU, the UE 202 and the RNS 216 can each start and end a compressed mode misaligned in time, as illustrated in FIG. 8. Time line 800 illustrates a measurement control message 802 successfully transmitted by the RNS 216 and received by the UE 202 at a time before the time (CFN value) indicated in the measurement control message 802. For the time line 800, the UE 202 and RSN 216 can start and end compressed mode aligned together. Time line 810 illustrates a measurement control message 804 delayed by retransmission until after the CFN value. For the time line 810, the UE 202 and the RNS 216 can start and end compressed mode at different times, and the compressed mode periods can be thus misaligned. As shown in FIG. 8, the RNS 216 can enter and end compressed mode earlier than the UE 202, resulting in error prone time segments 806. During the error prone time segments 806, one side of the connection can be in compressed mode, while the other can be not in compressed mode. For the error prone time segments 806, one side of the connection can expect transmissions with continuous frames, while the other side can expect frames that include transmission gaps. This compressed mode misalignment can result in incorrect reception of transmitted signals at the UE 202 and at the RNS 216.

Figure 9:
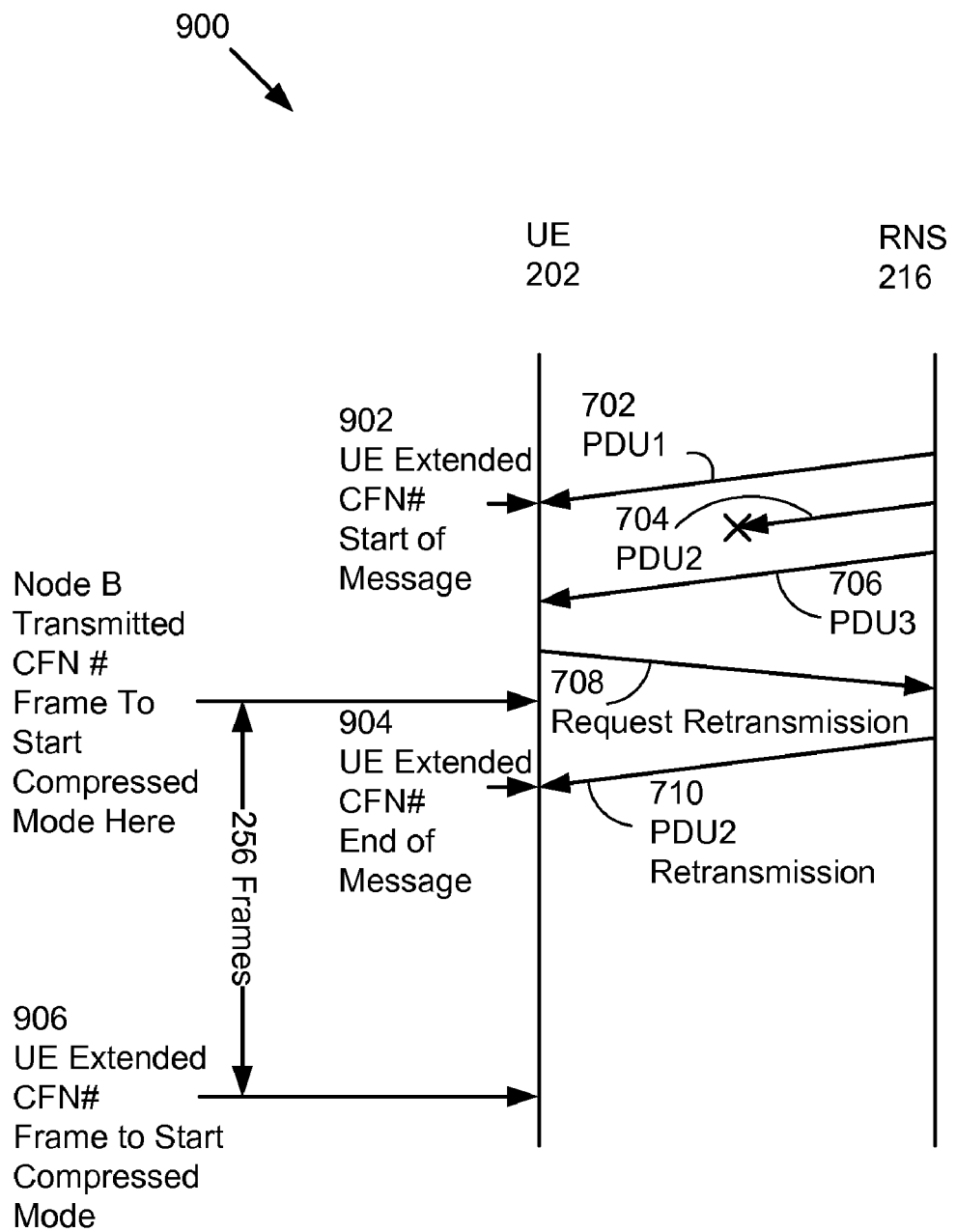
FIG. 9 illustrates synchronization frame counter value alignment with the packet transmission sequence of FIG. 7.

The UE 202 can minimize a misalignment of compressed mode time intervals by using knowledge of the time required to receive the entire measurement control message SDU from the RNS 216. Layer 2 processing in the UE 202 can re-assemble the measurement control message SDU from multiple individually received PDUs. The UE 202 can know an SFN value for each received PDU. As shown by the time line 900 in FIG. 9, the UE 202 can calculate an extended CFN for the first received PDU 902 and for the last received PDU 904 of the measurement control message SDU. Due to retransmissions, the last received PDU can differ from the final PDU in the reassembled measurement control message SDU. If the difference between the extended CFN value for the last received PDU and the extended CFN value for the first received PDU equals or exceeds 256 frames (i.e. the roll over modulo value), then the CFN values at the UE 202 can have "rolled over" during the time to receive the complete measurement control message SDU. In this case, the RNS 216 can have already started compressed mode by the time the UE 202 receives the final PDU. The UE 202 can enter compressed mode as soon as possible if the RNS 216 has already started compressed mode to minimize errors and maximize overlap of compressed mode intervals on both sides of the connection. While the above calculation can use the extended CFN value for the last received PDU 904, the UE 202 can also use a "current" extended CFN value to compare if the time elapsed between receiving the first PDU of the measurement control message SDU and the "current" time equals of exceeds the rollover time of 256 frames.

As described above, when the time to receive all of the PDUs in the measurement control message SDU equals of exceeds 256 frames, the local CFN counter can roll over. When the total time to receive all PDUs for the measurement control message SDU is less than 256 frames, the time to start compressed mode can also occur before the final PDU is received, particularly if the RNS 216 requests to start compressed mode in a frame that occurs soon after the first PDU is sent. As the RNS 216 can recognize that the local CFN counter at the UE 202 can roll over after 256 frames, the RNS 216 will not request in the measurement control message SDU that the compressed mode start at a time longer than 256 frames in the future. The UE 202 can calculate an extended CFN value 906 for a future frame in which the compressed mode should start based on the received CFN value in the measurement control message SDU. The UE 202 can determine a difference between the calculated extended CFN value 906 for the future start frame and the extended CFN value for the first received PDU 902. If the difference is equal to or greater than 256, then the actual frame in which to start the compressed mode can occur in the past. In this additional case, the RNS 216 can also have already started compressed mode by the time the UE 202 receives the final PDU. Again the UE 202 can enter compressed mode soon after detecting that the actual frame to enter compressed mode has passed to partially align compressed mode time intervals with the RNS 216.

Figure 10:
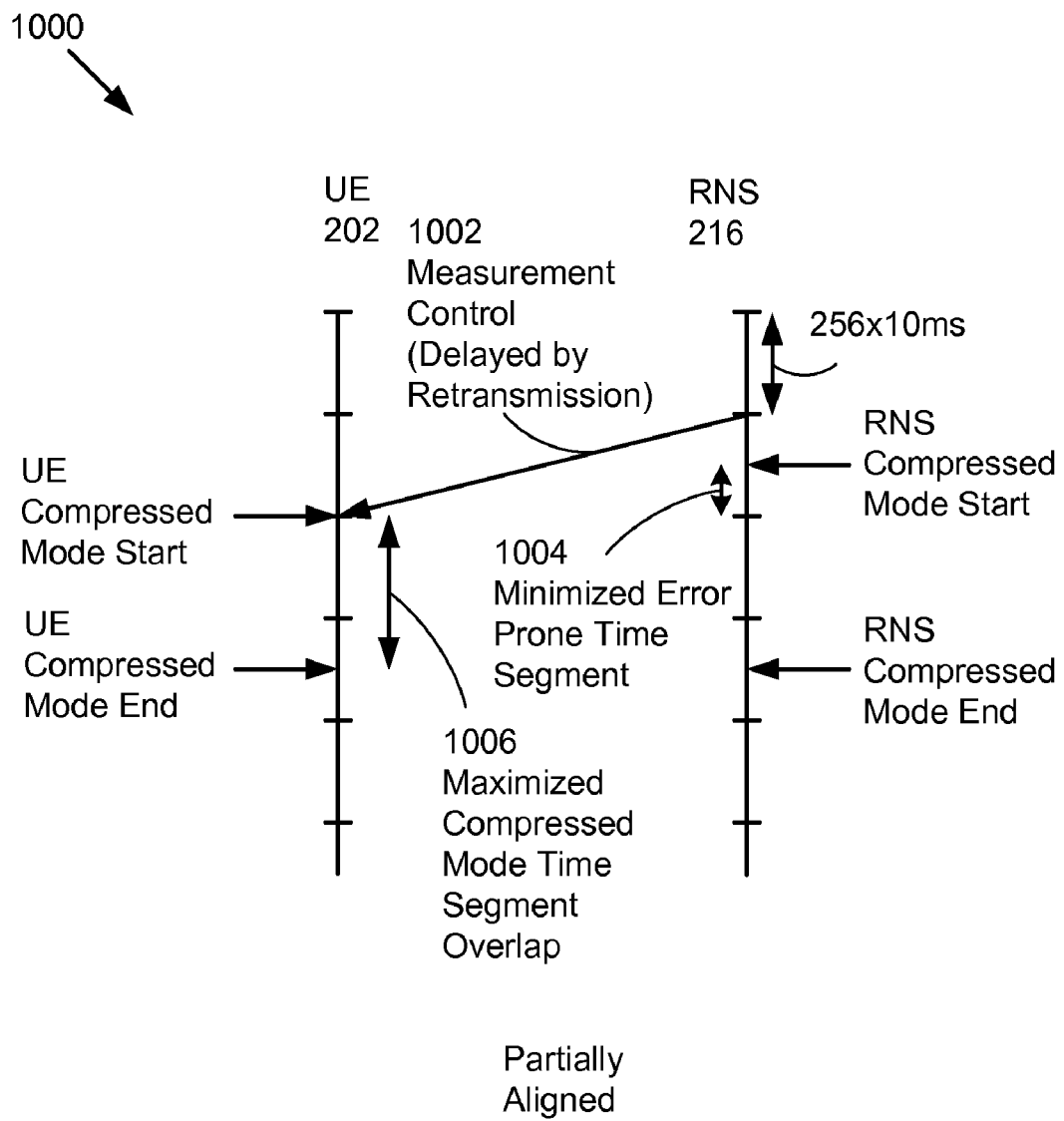
FIG. 10 illustrates partially aligned compressed mode intervals for a UE and an RNS.

FIG. 10 illustrates a UE 202 and RNS 216 with partially aligned compressed mode time intervals. The UE 202 can detect if a compressed mode start frame, as specified by the time indication in the measurement control message 1002 from the RNS 216, can occur in the past. The UE 202 can enter compressed mode as soon as possible after receiving the complete measurement control message 1002, as indicated in FIG. 1000, to maximize overlap of compressed mode time intervals at the UE 202 and the RNS 216. The time interval of non-overlap, i.e. from when the RNS 216 starts compressed mode to when the UE 202 starts compressed mode, can still produce errors, but this error prone time segment 1004 can been minimized in length by the immediate action of the UE 202. The UE 202 and the RNS 216 can both transmit using compressed mode during a time segment 1006 that has a maximized time overlap. The UE 202 can determine when to stop compressed mode based on parameters supplied by the RNS 216 in the measurement control message 1002. As the UE 202 can know when compressed mode started locally at the UE 202, the UE 202 can end compressed mode at the same time as the RNS 216 ends compressed mode. The compressed mode time segment at the UE 202 can be shorter than specified by parameters in the measurement control message 1002.

Figure 11:
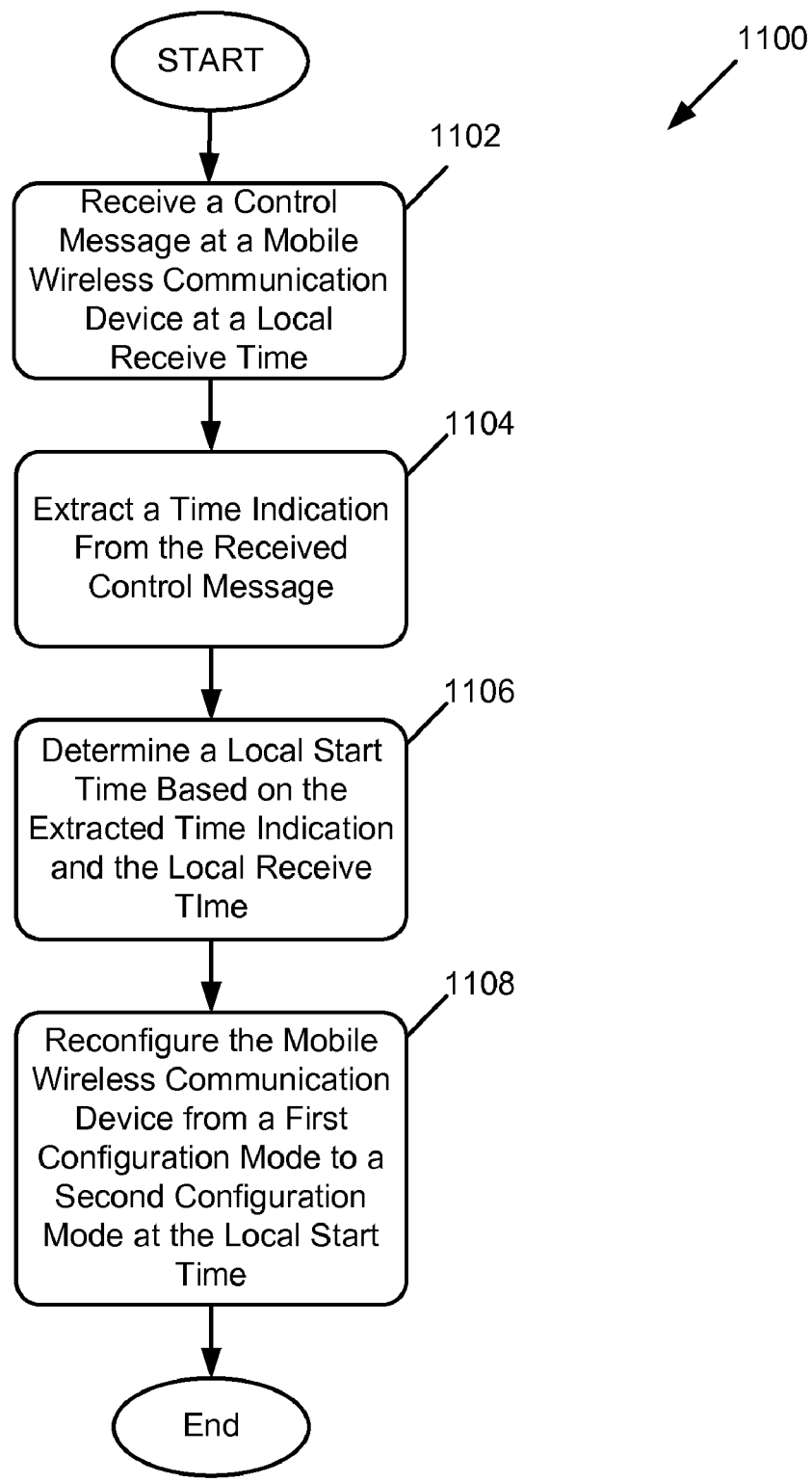
FIG. 11 illustrates a method for controlling a configuration time change in a mobile wireless communication device.

FIG. 11 outlines a method for controlling a configuration time change in a mobile wireless communication device. In step 1102, a mobile wireless communication device, connected to a wireless network in a first configuration mode, can receive a control message from a radio network subsystem in the wireless network at a local receive time. The mobile wireless communication device, in step 1104, can extract a time indication from the received control message. In step 1106, the mobile wireless communication device can use the extracted time indication and the local time at the mobile communication device when the control message was received to determine a local start time. The local start time can indicate when the mobile wireless communication device can change configurations. In step 1108, the mobile wireless communication device can reconfigure to a second configuration mode based at the determined local start time.

While the preceding description discusses entering and exiting a compressed mode, the same method can be applied to determine when to start a reconfiguration change requested by the RNS 216 to the UE 202 in a reconfiguration control message. If the reconfiguration control message specifies a frame using a CFN, then the same "roll over" issue described for the measurement control message can also occur on a noisy communication link that can delay complete reception by the UE 202 of the reconfiguration control message.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a mobile wireless communication device, wherein when the mobile wireless communication device is connected in a first configuration mode to a wireless network,
receiving a control message at a local receive time from a radio network subsystem in the wireless network;
extracting from the received control message a time indication for when to start a configuration mode change;
reconfiguring the mobile wireless communication device to a second configuration mode at a local start time based on the extracted time indication and the local receive time, wherein the mobile wireless communication device transmits and receives messages as a series of consecutive frames, and the second configuration mode includes transmitting or receiving at least one compressed frame having a transmission gap and at least one uncompressed frame having no transmission gaps;
maintaining a local frame counter based on a system frame counter provided by the radio network subsystem in the wireless network, wherein the extracted time indication to start the configuration mode change indicates a value for the local frame counter, and the value for the local frame counter is calculated modulo an integer N;
determining a first extended local frame counter value based on the system frame counter for a first received frame in the received control message;
determining a second extended local frame counter value based on the system frame counter for a last received frame in the received control message;
determining a third extended local frame counter value based on the extracted time indication, the third extended local frame counter value being greater than the second extended local frame counter value; and
configuring the mobile wireless communication device to the second configuration mode at a time earlier than indicated by the third extended local frame counter value when the difference between the third and first extended local frame counter values is at least equal to the integer value N.

2. The method as recited in claim 1, further comprising:
comparing the extracted time indication to the local receive time; and
reconfiguring the mobile wireless communication device to the second configuration mode immediately when the extracted time indication precedes the local receive time.

3. The method as recited in claim 1, wherein the control message includes a plurality of frames; and the local receive time is a value for the local frame counter when the final frame of the control message is correctly received by the mobile wireless communication device.

4. The method as recited in claim 1, further comprising:
determining a time interval value from a set of parameters extracted from the received control message; and
reconfiguring the mobile wireless communication device back to the first configuration mode at a local end time based on the determined time interval value and the local receive time.

5. The method as received in claim 4, wherein the local end time precedes the local start time plus the determined time interval value.

6. A mobile wireless communication device, comprising:
a wireless transceiver arranged to receive a configuration mode change message from a wireless network subsystem at a local receive time, the configuration mode change message including a plurality of message units and a time indication for the start of a configuration mode change from a first configuration mode to a second configuration mode; and
a processor coupled to the wireless transceiver, the processor arranged to execute instructions for:
extracting the time indication for the start of the configuration mode change from the received configuration mode change message,
comparing the extracted time indication to the local receive time,
reconfiguring the wireless transceiver to the second configuration mode at a time different than the extracted time indication when the extracted time indication precedes the local receive time,
determining a first time value when a first message unit of the configuration mode change message is received;
determining a second time value when all of the plurality of message units is received;
calculating a receive time interval based on a difference between the first and second time values, and
initiating the configuration mode change when the receive time interval exceeds a threshold.

7. The mobile wireless communication device as recited in claim 6, wherein the local receive time equals a local counter value when the configuration change message is completely received at the mobile wireless communication device.

8. The mobile wireless communication device as recited in claim 6, wherein the processor is further arranged to execute instructions for:
receiving transmissions from the wireless network subsystem as a series of consecutive frames; and
incrementing a finite length local counter by one counter value for each frame received;
wherein the threshold equals a time for the finite length local counter in the mobile wireless communication device to complete a full cycle of counter values.

9. The mobile wireless communication device as recited in claim 6, wherein the processor is further arranged to execute instructions for:
determining a time interval value from a set of parameters extracted from the received configuration mode change message, the time interval value specifying a time period length for the wireless transceiver to operate in the second configuration mode; and
reconfiguring the wireless transceiver from the second configuration mode back to the first configuration mode after a time interval shorter than specified by the determined time interval value.

10. The mobile wireless communication device as recited in claim 9, wherein the processor is further arranged to execute instructions for:
transmitting and receiving messages between the wireless transceiver and the wireless network subsystem as a series of consecutive frames;
wherein the first configuration mode uses continuous frames with no transmission gaps; and the second configuration mode includes at least one compressed frame having a transmission cap and at least one uncompressed frame having no transmission gaps.

11. The mobile wireless communication device as recited in claim 10, wherein the processor is further arranged to execute instructions for:
maintaining a finite length local counter based on a system counter provided by the wireless network subsystem; and incrementing the finite length local counter by one counter value modulo an integer value N for each frame received;

wherein the local receive time corresponds to a value of the finite length local counter for the final frame correctly received in the configuration mode change message.

12. Computer program product encoded in a non-transitory computer readable medium for reconfiguring a mobile wireless communication device connected to a wireless network, the computer program product comprising:

computer program code for receiving a control message at a local receive time from a radio network subsystem in the wireless network; non-transitory computer program code for extracting a time indication for when to start a configuration mode change from the received control message;

computer program code for reconfiguring the mobile wireless communication device to a second configuration mode at a local start time based on the extracted time indication and the local receive time;

computer program code for controlling a transceiver in the mobile wireless communication device to transmit and receive messages as a series of consecutive frames, wherein the second configuration mode includes transmitting or receiving at least one compressed frame having a transmission gap and at least one uncompressed frame having no transmission gaps;

computer program code for maintaining a local frame counter based on a system frame counter provided by the radio network subsystem in the wireless network, wherein the extracted time indication to start the configuration mode change indicates a value for the local frame counter, and the value for the local frame counter is calculated modulo an integer N;

computer program code for determining a first extended local frame counter value based on the system frame counter for a first received frame in the received control message;

computer program code for determining a second extended local frame counter value based on the system frame counter for a last received frame in the received control message; and computer program code for configuring the mobile wireless communication device to the second configuration mode at a time earlier than indicated by the extracted time indication when the difference between the second and first extended local frame counter values is at least equal to the integer value N, wherein values for the extended local frame counter are calculated modulo an integer M>N.

13. The computer program product as recited in claim 12, further comprising: computer program code for comparing the extracted time indication to the local receive time; and computer program code for reconfiguring the mobile wireless communication device to the second configuration mode immediately when the extracted time indication precedes the local receive time.

14. The computer program product as recited in claim 12, further comprising: computer program code for determining a time interval value from a set of parameters extracted from the received control message; and computer program code for reconfiguring the mobile wireless communication device back to the first configuration mode at a local end time based on the determined time interval value and the local receive time.

15. The computer program product as recited in claim 14, wherein the local end time precedes the local start time plus the determined time interval value.

16. A method, comprising:

at a mobile wireless communication device, wherein when the mobile wireless communication device is connected in a first configuration mode to a wireless network, receiving a control message at a local receive time from a radio network subsystem in the wireless network;

extracting from the received control message a time indication for when to start a configuration mode change;

reconfiguring the mobile wireless communication device to a second configuration mode at a local start time based on the extracted time indication and the local receive time, wherein the mobile wireless communication device transmits and receives messages as a series of consecutive frames, and the second configuration mode includes transmitting or receiving at least one compressed frame having a transmission gap and at least one uncompressed frame having no transmission gaps;

maintaining a local frame counter based on a system frame counter provided by the radio network subsystem in the wireless network, wherein the extracted time indication to start the configuration mode change indicates a value for the local frame counter, and the value for the local frame counter is calculated modulo an integer N;

determining a first extended local frame counter value based on the system frame counter for a first received frame in the received control message;

determining a second extended local frame counter value based on the system frame counter for a last received frame in the received control message; and configuring the mobile wireless communication device to the second configuration mode at a time earlier than indicated by the extracted time indication when the difference between the second and first extended local frame counter values is at least equal to the integer value N.

17. The method as recited in claim 16, further comprising: comparing the extracted time indication to the local receive time; and reconfiguring the mobile wireless communication device to the second configuration mode immediately when the extracted time indication precedes the local receive time.

18. The method as recited in claim 16, further comprising: determining a time interval value from a set of parameters extracted from the received control message; and reconfiguring the mobile wireless communication device back to the first configuration mode at a local end time based on the determined time interval value and the local receive time.

19. The method as recited in claim 16 wherein the control message includes a plurality of frames; and the local receive time is a value for the local frame counter when the final frame of the control message is correctly received by the mobile wireless communication device.

20. The method as received in claim 18, wherein the local end time precedes the local start time plus the determined time interval value.

21. Computer program product encoded in a non-transitory computer readable medium for reconfiguring a mobile wireless communication device connected to a wireless network, the computer program product comprising:

computer program code for receiving a control message at a local receive time from a radio network subsystem in the wireless network;

computer program code for extracting a time indication for when to start a configuration mode change from the received control message;

computer program code for reconfiguring the mobile wireless communication device to a second configuration mode at a local start time based on the extracted time indication and the local receive time;

computer program code for controlling a transceiver in the mobile wireless communication device to transmit and receive messages as a series of consecutive frames, wherein the second configuration mode includes transmitting or receiving at least one compressed frame having a transmission gap and at least one uncompressed frame having no transmission gaps;

computer program code for maintaining a local frame counter based on a system frame counter provided by the radio network subsystem in the wireless network, wherein the extracted time indication to start the configuration mode change indicates a value for the local frame counter, and the value for the local frame counter is calculated modulo an integer N;

computer program code for determining a first extended local frame counter value based on the system frame counter for a first received frame in the received control message; computer program code for determining a second extended local frame counter value based on the system frame counter for a last received frame in the received control message;

computer program code for determining a third extended local frame counter value based on the extracted time indication, the third extended local frame counter value being greater than the second extended local frame counter value; and computer program code for configuring the mobile wireless communication device to the second configuration mode at a time earlier than indicated by the third extended local frame counter value when the difference between the third and first extended local frame counter values is at least equal to the integer value N; wherein values for the extended local frame counter are calculated modulo an integer M>N.

* * * * *